United States Patent [19]

Wirz

[11] 4,395,050

[45] Jul. 26, 1983

[54] SEALING ARRANGEMENT SPECIFICALLY FOR SHUT OFF DEVICES

[75] Inventor: Peter Wirz, Unterkulm, Switzerland

[73] Assignee: Klinger AG, Zug, Switzerland

[21] Appl. No.: 265,274

[22] Filed: May 20, 1981

[30] Foreign Application Priority Data

May 22, 1980 [DE] Fed. Rep. of Germany ....... 3019516

[51] Int. Cl.³ .............................................. F16K 25/00
[52] U.S. Cl. .................................. 277/236; 251/159; 251/174; 251/176; 277/DIG. 6
[58] Field of Search ............... 251/159, 158, 176, 174; 277/233, 234, 235 A, DIG. 6

[56] References Cited

U.S. PATENT DOCUMENTS

| | | | |
|---|---|---|---|
| 2,641,381 | 6/1953 | Bertrand | 277/235 A |
| 2,919,486 | 1/1960 | Banquarel | 277/235 A |
| 3,042,359 | 7/1962 | Bredtschneider | 251/172 |
| 3,690,685 | 9/1972 | Porner | 277/235 A |
| 3,945,390 | 3/1976 | Huber | 137/1 |
| 4,105,187 | 8/1978 | Huber | 251/334 |

FOREIGN PATENT DOCUMENTS

| | | |
|---|---|---|
| 1133606 | 7/1962 | Fed. Rep. of Germany . |
| 1550299 | 1/1970 | Fed. Rep. of Germany . |
| 2307212 | 8/1973 | Fed. Rep. of Germany . |
| 2523152 | 11/1976 | Fed. Rep. of Germany . |
| 2745139 | 12/1979 | Fed. Rep. of Germany . |

*Primary Examiner*—Robert I. Smith
*Attorney, Agent, or Firm*—Abelman, Frayne & Rezac

[57] ABSTRACT

A sealing arrangement specifically for shut off devices is disclosed. A shut off device has two annular metallic sealing members of which one is a rigid body and the other is a thin-walled elastically deformable body. One of the sealing members features a considerable large hardness. The other sealing member comprises a coating of a soft metal, filling all irregularities of the surface thereof. Upon closing of the shut off device the surfaces of the two sealing members rub against each other, whereby the coating of soft metal is rubbed off until portions thereof remain in the recesses of the metal forming the substrate of this sealing member. This assures an excellent sealing of the shut off device.

9 Claims, 6 Drawing Figures

SEALING ARRANGEMENT SPECIFICALLY FOR SHUT OFF DEVICES

BACKGROUND OF THE INVENTION

1. Field of the Invention

The present invention relates to a sealing arrangement specifically for shut off devices having two annular metallic sealing members which are movable relative to each other, which sealing members are each connected to one of two sealing parts or integrally formed at said sealing parts and abut each other with pressure in the shut off position of the shut off device.

2. Description of the Prior Art

The two sealing members of a great number of known sealing arrangements contact each other in the shut off position of the respective shut off device along a broad annular surface area. This leads in such cases to difficulties, in which the mutual pressure prevailing between the two sealing members in the shut off position must be relatively small. This may be the case in which the sealing members are brought into the sealing position at a sliding relative movement whereby the rotary moments prevailing thereby must be held within allowable limits. Attempts to solve mentioned problem of such sealing arrangements have been a mutual lapping of the two sealing members or to provide one of the sealing elements with a thick soft metal coating, in which the annular sealing surface area forms itself. Because the relative pressure force distributes itself over an annular surface area, the prevailing surface area pressure is rather small and a mutual accommodation or matching, respectively, of the sealing elements is not possible in such cases where the sealing elements are subject to deformations due to pressure and/or temperature conditions.

SUMMARY OF THE INVENTION

Hence, it is a general object of the present invention to provide an improved construction of a sealing arrangement having improved sealing properties and is insensible to pressure and/or temperature generated deformations whereby the sealing elements slide on each other during the last step of the closing movement thereof.

A further object is to provide an improved sealing arrangement of a shut off device in which one sealing member is a thin-walled elastically deformable body, which in the closed position of the shut off device abuts another sealing member along a line-like contact area and having improved sealing characteristics. Such a thin-walled elastic deformable sealing member can adjust itself to a prevailing surface shape of the other sealing element in that it is under an elastic pretension such that due to mentioned line contact the contact pressure of a given area unit can be comparably higher. Generally known shut off devices having such a thin-walled elastically deformable body have shown not to reach the sought tightness or sealing properties, respectively, due to the limited allowable pressure forces. A lapping of the two elements of such known construction does not lead to an improved sealing property due to the extremely small width of the sealing contact lines and due to the high contact pressure forces a soft metal coating will not last long.

A further object of the invention is to equalize surface irregularities in the area of mentioned contact lines by the agency of a soft metal such to avoid leakages and furthermore to give the surface areas forming these contact lines a certain hardness such that those portions of the surface areas which are supporting areas as well as areas gliding on each other are giving the necessary rigidity.

Now, in order to implement these and still further objects of the invention, which will become more readily apparent as the description proceeds, the sealing arrangement of this development is manifested by the features that said sealing members feature at the surface areas defining said lines of contact a Rockwell C-hardness of more than 30 HRC (corresponding to a Vickers hardness of 298 HV), preferably a hardness of 50 HRC (525 HV), and that surface irregularities at the area of said lines of contact of at least one of said sealing members are filled by a soft metal.

Such a construction of the sealing members follows in that the forces acting or prevailing, respectively, between the two members are transmitted mainly over or by the not-filled-in portions of their surface areas defining mentioned lines of contact such that also in case of a relatively high surface pressure of a line contact the sealing members cannot be damaged whereby the sealing action is safely secured due to the filled-in soft metal.

In a practical execution of an embodiment of the invention one of the surface areas of a sealing member, which surface area defines a line of contact, will be initially covered completely by a soft metal. However, due to the rubbing motion, the gliding of the two sealing members on each other at the lines of contact, this soft metal will be eroded after a few closing motions of the shut off device to such an extent that this soft metal fills in only irregularities of the surface. Such a soft metal may be an easily deformable metal such as copper, a soft nickel or similar metals. A silver coating is to be preferred in such cases where a plant operation or specification forbids the use of nonferrous metal and where corrosion-proof materials must be used.

According to an embodiment of the invention the deformable sealing member can comprise as the surface area defining the lines of contact a current-less applied coating of nickel with a thickness of preferably about 10–60 $\mu$m whereby a best cooperation with the corresponding surface of the other sealing element is achieved in that this one comprises a Vickers hardness of about 600 $HV_{01}$. As mentioned above, the soft metal may be due to corrosion-proof standards a silver coating comprising preferably a thickness of 5–10 $\mu$m and a hardness of about 80 $HV_{01}$. A specifically lasting sealing property is achieved in such case in which this silver coating is applied on top of the hard layer of the deformable sealing member preferably by applying an intermediate layer of gold improving the bond between the silver coating and the substrate. If one of the sealing members is a not deformable body, it could be constructed completely of a hard material such that a preferred and simplest embodiment of such a sealing member is a design of this rigid sealing member of a hardenable steel having at the surface area defining the lines of contact a hardness of 50–60 HRC.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENTS

Figure 1:
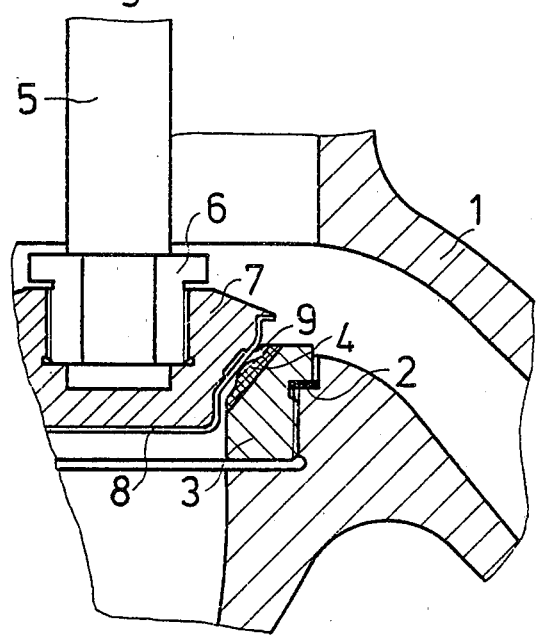
FIG. 1 is a sectional view through a first embodiment of a sealing arrangement construction according to the present invention.
Figure 5:
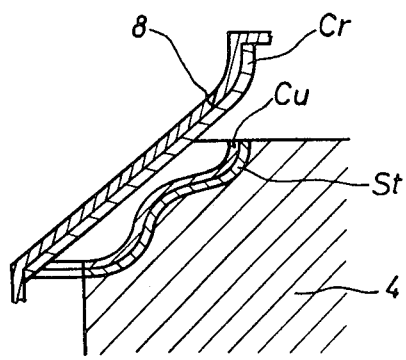
FIG. 5 is a section through a portion of the embodiment shown in FIG. 1 whereby thicknesses are shown on an enlarged scale.

Describing now the drawings and considering initially the exemplary embodiment as shown in FIG. 1 it will be understood that the same comprises a casing 1 and an annular valve seat 3 screwed into the casing 1 and sealed thereagainst by a seal 2. A valve cone 7 forming the closure member of the valve is connected by the agency of a double screw joint 6 to an operating spindle 5 whereby this valve cone 7 may be rotated however is in axial direction thereof not movable. A thin-walled cup shaped sleeve 8 is sealingly connected to the valve cone 7 in that it is welded thereto. This cup shaped sleeve 8 forms a sealing member of this embodiment of the invention whereby the annular valve seat 3 screwed into the casing 1 forms the other sealing member. If now the valve cone forming the closure member of the valve is moved against the annular valve seat 3 due to an axial movement of the valve spindle, the cone shaped annular portion of the cup shaped sleeve 8 comes into contact with a bulged element 4 formed on the cone shaped bore of the annular valve seat 3. Upon a further movement of the spindle this annular portion of the cup shaped sleeve 8 undergoes an elastic deformation and generates therefore the necessary elastic pressure forces necessary for its adjusting itself to the shape of the bulged element 4 on the annular valve seat 3. According to the invention the elastically deformable cup shaped sleeve 8 connected to the valve cone 7 is provided at its outer surface 9 forming the line of contact with a coating of an galvanically precipitated hard chromium having a thickness of 5 $\mu$m and a hardness of 940 $HV_{01}$. In FIG. 5 this chromium coating is identified by Cr overlying the sleeve 8. The annular valve seat 3 having the bulged element 4 and defining a cone shaped bore and being the other not deformable sealing member comprises on that section of the bulged element 4 defining the contact line a building-up welding of stellite having a hardness of preferably 40 HRC such as identified in FIG. 5 by the letters St. This hard bore of the cone is covered by a metallic coating of copper Cu having a hardness of 120 $HV_{01}$ and a coating thickness of 5–10 $\mu$m. Due to the fact that both sealing elements comprise at the surface areas defining in the valve shut off position together the contact lines a considerable hardness and because mentioned copper coating rubs off after a small number of opening and closing movements of the valve however equalizes surface irregularities the sought sealing capability of the valve is achieved although only relative small axial forces prevail.

Figure 3:
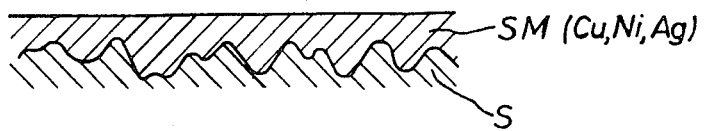
FIG. 3 is on an enlarged scale a section through a sealing member surface having an initially applied coating.
Figure 4:
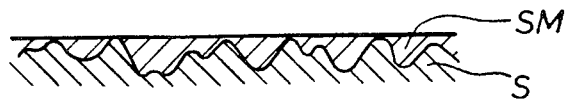
FIG. 4 is a section similar to the section of FIG. 3 after a number of closing motions of a shut off device.

This is shown specifically in FIGS. 3 and 4 showing a section with exaggerated thickness. On the substrate S, for instance, mentioned stellite, an initial soft metal SM which in the above described embodiment is Cu but may be a soft Ni or an Ag is applied such to form an initial coating. After some movements of the sealing members relative to each other and rubbing against each other the soft metal layer SM such as shown in FIG. 4 is rubbed off down to the peaks of the irregularities of the stellite substrate S and such that only the interstices between these peaks are filled with the soft metal. Accordingly, there is a hard metal to metal contact between the two sealing elements whereby, however, the interstices of one sealing element is filled by a soft metal thus allowing high contact pressures although a soft metal is used.

Figure 2:
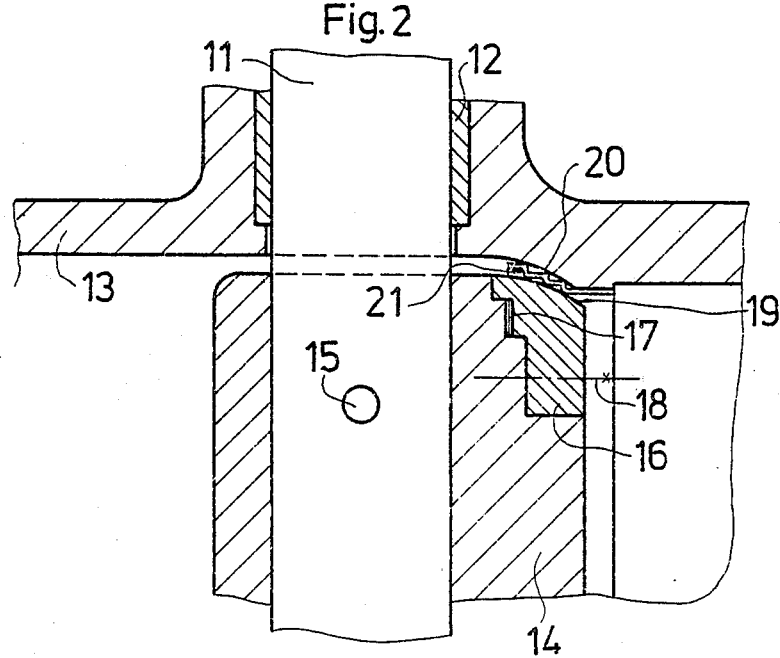
FIG. 2 is a sectional view through a second embodiment of a sealing arrangement designed according to the present invention.

The shut off valve shown in FIG. 2 is a further preferred embodiment. It comprises basically an operating shaft 11, which is supported by the agency of a sleeve bearing 12 in the valve casing 13 such that it may be rotated relatively thereto, however is not movable in axial direction thereof. A flap disc 14 forming a sealing part is rigidly connected by means of bolts 15 to mentioned operating shaft 11. A separate ring 16 is inserted in such area of the flap disc 14, which forms in the valve closed position the sealing proper against the housing 13. Between the flap disc 14 and the ring 16 a seal 17 is provided. The ring 16 is mounted to the flap disc 14 by screw bolts 18. Accordingly, a rigid and sealed connection between ring 16 and flap disc 14 prevails. This ring 16 forming one member of the sealing arrangement according to the invention acts together with a body forming a sealing element 20, which body is made preferably from an austenitic sheet metal having several concentric undulations such a shown in FIG. 2. This metal sheet acting as sealing element 20 is sealingly welded to the casing 13. The sealing element 20 rests in the shown sealing position thereof elastically deformed at its wave crests on the ring 16 at one side and on the casing 13 at the other side. Because three waves are present as shown in the drawing which abut or engage, respectively, the ring 16 forming line contact, there are present three sequentially arranged sealing lines. If the parts mounted to the operating shaft 11 are moved into their sealing position upon a rotation of this shaft 11, a sliding relative movement prevails between ring 16 and the three waves of the elastic sealing element 20. Obviously, the pressure force at the contact lines increases until the sealing end position is attained. The location of the sealing members relative to each other is chosen such that upon a deformation of the thin-walled sealing element 20 only such pressure forces may arise which allow a still allowable rotary operating force. The ring 16 mounted to the flap disc 14 is manufactured from a hardenable chromium steel having a chrom content of about 13–17% and features due to a surface hardening thereof at the sealing surface area 19 along the contact lines a hardness of about HRC 56–60.

Figure 6:
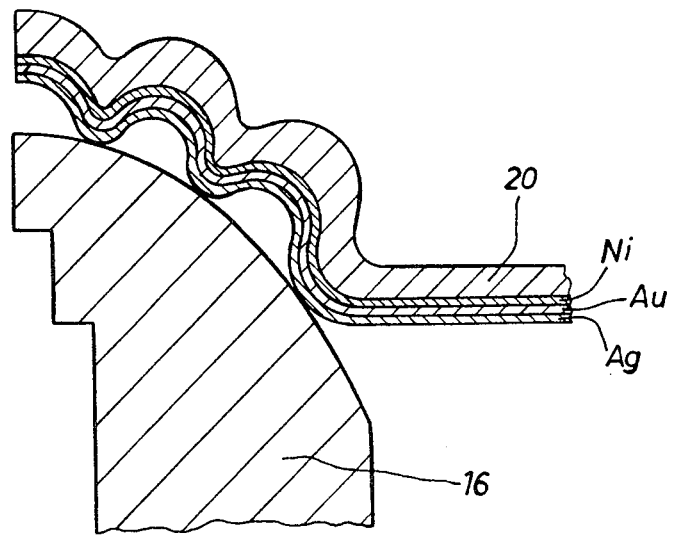
FIG. 6 is a section through a part of the embodiment shown in FIG. 2 where thicknesses are shown on an enlarged scale.

In addition to FIG. 2 attention is now directed to FIG. 6. The sealing element 20 manufactured from a sheet metal comprises as surface area 21 forming the lines of contact a coating of chemically applied nickel Ni preferably a nickel-phosphorus having a thickness of maximal 60 $\mu$m. By means of a heat treatment in a protective gas or in vacuum by a temperature of 650° C.

and during a time span from 1 to 2 hours a hardness of about 600 $HV_{01}$ is achieved. On top of this Ni containing layer a further coating of gold Au with a thickness of about 0.2 μm is applied. Onto this Au coating there is applied a coating of pure silver Ag having a thickness of 5 μm and a hardness of about 80 $HV_{01}$. These coatings or layers, respectively, are shown on an exaggerated scale in FIG. 6. After a small number of opening and closing movements of the valve the silver layer is practically completely rubbed off the peaks of the irregularities of the surface area along the contact lines such as shown in FIG. 4 however the silver is still present in the recesses; in a practical embodiment it could, however, not be clearly ascertained how much silver is deposited also in the recesses of the other sealing member, i.e. on the surface of ring 16. At any rate, after a few thousand operations of the valve and by temperatures up to 400° C. an impeccable sealing capacity of the valve in its closed position is attained whereby the transmittal of the pressure forces between the sealing members proceeds obviously to the largest extent via the peaks of the irregularities of the hard surface areas forming the lines of contact.

While there are shown and described present preferred embodiments of the invention, it is to be distinctly understood that the invention is not limited thereto, but may be otherwise variously embodied and practiced within the scope of the following claims.

Accordingly, what is claimed is:

1. In a sealing arrangement for a valve having a valve seat member and a cooperating valve closure member, a thin-walled elastically deformable member carried by one of said valve members and which is engageable with the other of said valve members substantially in line contact therewith, and means for moving one of said valve members laterally relatively to the other of said valve members to seat said thin-walled elastically deformable member on the other of said valve members, the improvement comprising:

each of said thin-walled elastically deformable member and said other valve member being comprised of a metal body of a hardness in excess of 30 HRC (298 HV);

a continuous coating on top of one of the metal bodies and being of a soft, ductile metal of a hardness appreciably less than the hardness of said metal body and located at least at the area of said line contact and overlying thereat the surface of said metal body completely filling any surface, discontinuities, micropores and interstices;

said soft metal coating being shearing by lateral movement of said valve and deformable members relatively to each other by abrasive action of the hard metal surface onto the soft metal surface until establishment of direct contact between the surface of the hard metal body without coating and the exposed hard metal areas of the metal body provided with the coating, the surface discontinuities, micropores and interstices of later metal body remaining filled by said soft metal such that the mechanical closure forces are carried and transmitted by the exposed hard metal body areas only, and said no load carrying surface discontinuities, micropores and interstices remain filled by said soft metal to ensure a perfect seal.

2. The sealing arrangement of claim 1, wherein said hardness has a value of more than 50 HRC (525 HV).

3. The sealing arrangement of claim 1, wherein said surface area defining said lines of contact of said deformable sealing member comprises a current-less applied layer of Ni with a thickness of about 10-60 μm.

4. The sealing arrangement of claim 3, wherein said Ni-layer comprises a hardness of about 600 $HV_{01}$.

5. The sealing arrangement of claim 1, wherein said soft metal is silver.

6. The sealing arrangement of claim 5, wherein said soft metal in its applied state defines a coating of said surface areas defining said lines of contact, which coating comprises a thickness of about 5-10 μm and a hardness of about 80 $HV_{01}$.

7. The sealing arrangement of claim 5, wherein said surface area defining said lines of contact of said deformable sealing member comprises a current-less applied layer of Ni with a thickness of about 10-60 μm and a hardness of about 600 $HV_{01}$, further wherein said silver in its applied state defines a coating of said surface areas defining said lines of contact having a thickness of about 5-10 μm and a hardness of about 80 $HV_{01}$, and wherein said silver coating is applied on said hard layer on said deformable sealing element.

8. The sealing arrangement of claim 7, wherein an intermediate layer of gold is arranged between said silver coating and said hard layer.

9. The sealing arrangement of claim 8, wherein said other sealing element is manufactured of a hardenable steel and features at said surface areas defining said lines of contact a hardness of about 50-60 HRC.

* * * * *